United States Patent [19]

Campbell

[11] 4,229,738
[45] Oct. 21, 1980

[54] EARLY-LATE GATE

[75] Inventor: Robert T. Campbell, Acton, Mass.

[73] Assignee: The United States of America as represented by the Secretary of the Army, Washington, D.C.

[21] Appl. No.: 4,636

[22] Filed: Jan. 19, 1979

[51] Int. Cl.³ .............................................. G01S 13/70
[52] U.S. Cl. ............................................................ 343/7.3
[58] Field of Search ........................................ 343/7.3

[56] References Cited
U.S. PATENT DOCUMENTS

| | | | |
|---|---|---|---|
| 4,002,969 | 1/1977 | Barley et al. | 324/57 N |
| 4,083,048 | 4/1978 | DeRosa | 343/7.3 |

Primary Examiner—Malcolm F. Hubler
Attorney, Agent, or Firm—Nathan Edelberg; Robert P. Gibson; Freddie M. Bush

[57] ABSTRACT

An early-late gate for a high resolution range tracking system of a radar using a high frequency double-balanced mixer in conjunction with a bi-polar pulse gate allows simplified early-late gating for a range error measuring system.

4 Claims, 4 Drawing Figures

EARLY-LATE GATE

DEDICATORY CLAUSE

The invention described herein was made in the course of or under a contract or subcontract thereunder with the Government and may be manufactured, used, and licensed by or for the government for governmental purposes without the payment to me of any royalties thereon.

BACKGROUND OF THE INVENTION

In radar range tracking systems for measuring time alignment error of an input signal, an early-late gate is generated to aid in sensing arrival time of the signal. FIG. 1 discloses a typical conventional early-late gate. RF (radio frequency) input pulses are coupled simultaneously into first and second channels having amplifiers 1 and 2 and RF switches 3 and 4 respectively. Amplifier 2 provides a phase reversal to that of amplifier 1. A summer 5 combines the channel outputs and provides the combined early-late gate. Video pulses are used to gate switches 3 and 4, the pulse to switch 4 beginning simultaneously with the ending of the pulse to switch 3. Any RF energy occuring during the pulse to switch 3 is amplified and gates into the summer, while any RF energy occuring during the pulse to switch 4 is inverted before being gated to the summer. This conventional method requires separate amplifiers/inverters, RF switches and summing circuitry.

A time alignment error sensor system is disclosed in U.S. Pat. No. 4,083,048 issued Apr. 4, 1978 to Robert J. DeRosa and Robert T. Campbell, the inventor of the instant invention. This system discloses the use of both a normal and split gate in determining time alignment error. Quadrature summing of the signals allows the time alignment error to be encoded as a phase angle which allows error decoding between incoming RF pulses and time reference for range tracking.

SUMMARY OF THE INVENTION

In a range error measuring system, a high frequency doublebalanced mixer in conjunction with a bi-polar pulse input allows simplified early-late gate processing of incoming RF pulses. The early-late gate aids in sensing the time difference of the arrival of the center of a RF pulse from a specified time.

DESCRIPTION OF THE PREFERRED EMBODIMENT

Figure 1:
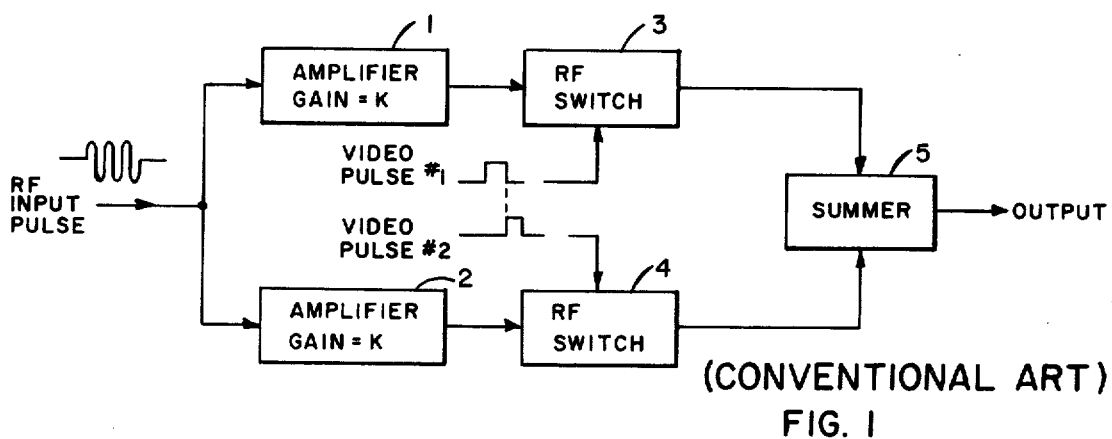
FIG. 1 is a block diagram of a prior art system for providing early-late gating.
Figure 2:
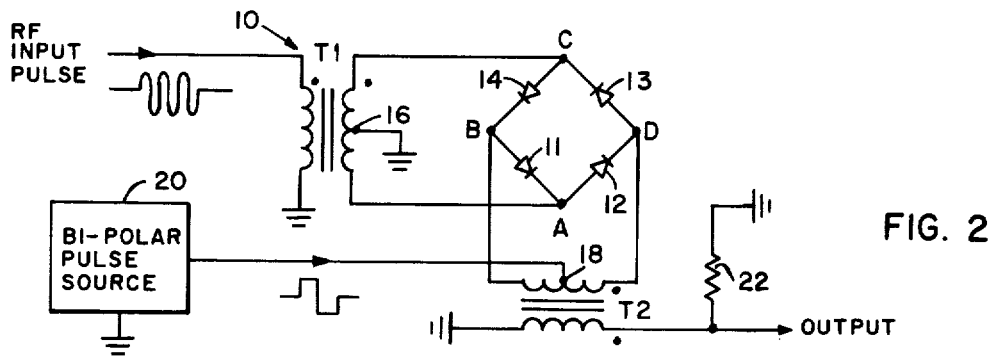
FIG. 2 is a preferred embodiment of a double-balanced mixer adapted for providing early-late gating.

Referring now to the drawings wherein like numbers represent like parts, FIG. 1 discloses the conventional method of generating an early-late gate. Operation of this prior art system has been disclosed in the Background of the Invention as a typical prior art device. FIG. 2 discloses a preferred embodiment of the invention wherein transformer T1 of double-balanced mixer 10 is adapted to receive radio frequency input pulses. The secondary of T1 is coupled across a diode bridge comprising diodes 11, 12, 13 and 14, being coupled to the anodes of diodes 12 and 14 at points A and C and having a grounded or common center tap 16. Similarly transformer T2 has one side coupled to the anodes of diodes 11 and 13 at points B and D, and a center tap 18 adapted for receiving video pulse inputs from a bi-polar pulse source 20. Pulses from source 20 are coupled through the winding of T2, the diode bridge, the winding of T1, and back to source 20 through center tap 16 to ground. The other winding of T2 is coupled on one side to circuit common and on the other side to provide an output signal. The output is developed across the resistive load 22 to ground or common.

Figure 3:
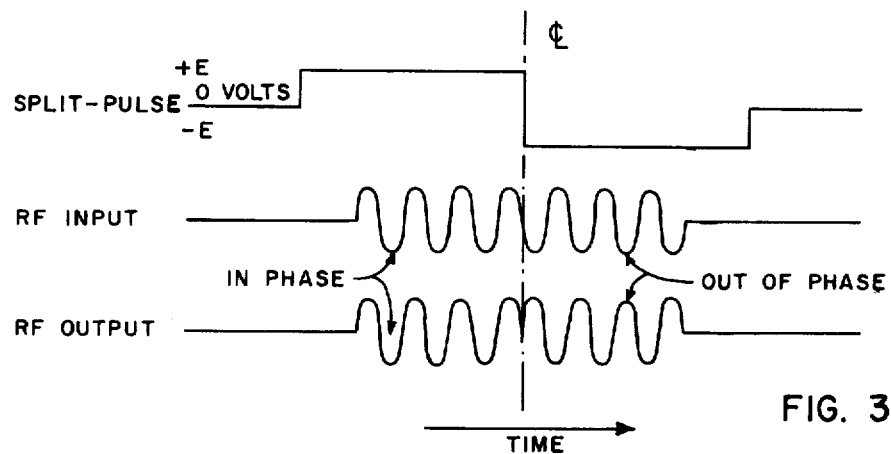
FIG. 3 discloses typical RF and split-pulse waveforms for the embodiment of FIG. 2.

The RF pulse input to the double-balanced mixer normally consists of a narrow burst of RF energy, the carrier frequency being in the order of 60 MHz present for a duration as short as 50 nanoseconds. A bi-polar video pulse that swings above and below ground is applied to the video input and is termed a "split pulse". The center of the split-pulse is referenced to the center of the RF input pulse as shown in FIG. 3.

Figure 4:
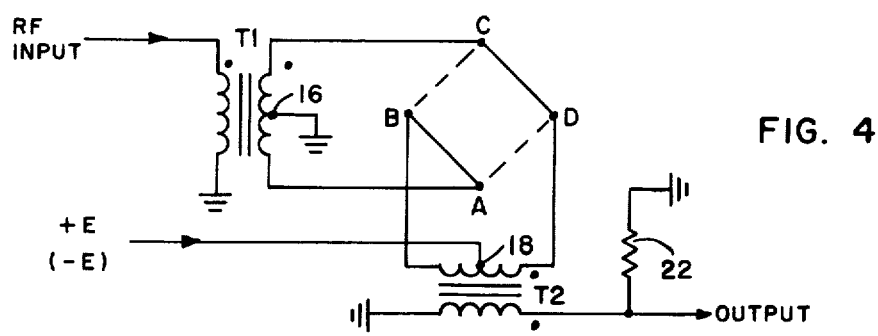
FIG. 4 is an equivalent circuit for the embodiment of FIG. 2.

During the first half of the split-pulse a positive voltage (E+) is applied to the center tap of transformer T2 causing diodes 11 and 13 to be turned on (forward biased) and diodes 12 and 14 to be cut-off (reversed biased). As a result, the transformers T1 and T2 become connected as shown in FIG. 4 without the dashed lines. Dashed lines BC and AD are effectively open circuited by the reverse biased diodes 12 and 14, while solid lines AB and CD are effectively short circuits created by forward biased diodes 11 and 13. This allows the output voltage across load resistance 22 during the first half of the split-pulse to be in phase with the RF input as shown in FIG. 3.

During the second half of the split-pulse, a negative voltage (E−) is applied to the center tap of transformer T2 causing diodes 12 and 14 to be turned on (forward biased) and diodes 11 and 13 to be cut off (reverse biased). As a result, the transformer T1 and T2 become effectively connected as shown by the dashed lines of FIG. 4, while lines AB and CD are open circuited by diodes 11 and 13. Since the transformer connections between T1 and T2 have been reversed with respect to those during the first half of the split-pulse, the resulting output during the second half of the split-pulse is out of phase with the RF input.

When the center of the RF pulse is coincident with the center of the split-pulse, the output will be a RF pulse, the first half of which is in phase with the input RF and the second half out of phase with the input RF. When the RF input pulse is perfectly aligned with the center of the split-pulse, as shown in FIG. 3, the resulting output energy on either side of center of the split-pulse is equal; however, the voltages are out of phase. When the center of the RF pulse is displced in time to either side away from the center of the split-pulse, the polarity of the voltages remain the same. However, the amount of RF energy occuring during the first half of the split-pulse will differ from that during the second half, which is indicative of the time alignment error.

Subsequently the output from the early-late gate can be applied to narrow band filters and phase detectors to resolve and process time alignment errors, as is established in the prior art. Double-balanced mixers are commercially available having bandwidths in excess of 150 MHz with rise and fall times in the order of 2 nanoseconds and on-off ratios of 50 db in a volume of less than 0.15 cubic inches.

Although a particular embodiment and form of this invention has been illustrated, it is apparent that various modifications and embodiments of the invention may be made by those skilled in the art without departing from the scope and spirit of the foregoing disclosure. Accordingly the scope of the invention should be limited only by the claims appended hereto.

I claim:

1. In a range tracking system of a radar a method for providing early-late gating of radio frequency input pulses with a double-balanced mixer and comprising the steps of:

applying bi-polar pulses to the center tap of a first transformer of said double-balanced mixer, selectively gating a diode bridge of said double-balanced mixer on and off in response to said bi-polar pulses, and directing radio frequency input pulses to a second transformer of said mixer for coupling through said bridge and first transformer to provide an output signal in accordance with the on-off state of said diode bridge.

2. A method for providing early-late gating as set forth in claim 1 and further comprising the step of phase shifting the radio frequency input signal by said mixer during alternate half cycles of said bi-polar pulses for providing output voltage pulses which are out of phase during said alternate half cycles and thereby providing pulse time alignment error signals.

3. Apparatus providing an early-late gate for producing time alignment error signals and comprising: a double-balanced mixer having a first input adapted for receiving radio frequency input pulses, a second input adapted for receiving bi-polar video pulses, and an output for coupling output signals therefrom, said output signals being time alignment error signals; and a bi-polar pulse source coupled to said second mixer input for providing split-pulse gating of radio frequency signals coupled thereto.

4. Apparatus as set forth in claim 3 wherein said mixer comprises first and second transformer and a diode bridge, said mixer first input being coupled through said first transformer to said bridge, said mixer second input being coupled through a center tap of a first winding of said second transformer to said bridge for providing bi-polar pulse gating of said bridge diodes and thereby alternating radio frequency signal flow through said bridge and said first winding to selectively change polarity of the radio frequency output; a second widning of said second transformer being adapted to provide said time alignment signals therefrom.

* * * * *